US009228890B2

United States Patent
Omichi et al.

(10) Patent No.: US 9,228,890 B2
(45) Date of Patent: Jan. 5, 2016

(54) METHOD OF MEASURING ACOUSTIC DISTRIBUTION AND DISTRIBUTED ACOUSTIC SENSOR

(71) Applicant: FUJIKURA LTD., Koto-ku, Tokyo (JP)

(72) Inventors: Koji Omichi, Sakura (JP); Yoshihiro Terada, Sakura (JP); Daiichiro Tanaka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 315 days.

(21) Appl. No.: 13/907,371

(22) Filed: May 31, 2013

(65) Prior Publication Data

US 2013/0333476 A1    Dec. 19, 2013

Related U.S. Application Data

(60) Provisional application No. 61/654,472, filed on Jun. 1, 2012.

(51) Int. Cl.
*G01H 9/00* (2006.01)
(52) U.S. Cl.
CPC . *G01H 9/004* (2013.01); *G01H 9/00* (2013.01)
(58) Field of Classification Search
CPC .. G01H 9/004; G01B 9/02004; G01B 9/0201; G01B 9/02007; G01B 9/02027; G01B 9/0209
USPC ............ 73/655, 656, 657; 356/462, 477, 478, 356/484, 480; 250/227.19, 227.23, 227.18, 250/231.1
See application file for complete search history.

(56) References Cited

U.S. PATENT DOCUMENTS

| 4,996,419 | A  | * | 2/1991  | Morey .................... 250/227.18 |
| 5,670,489 | A  | * | 9/1997  | Baxter et al. ................ 514/44 A |
| 5,987,197 | A  | * | 11/1999 | Kersey ............................ 385/24 |
| 6,195,162 | B1 | * | 2/2001  | Varnham et al. ............... 356/478 |
| 6,490,390 | B1 | * | 12/2002 | Wilcox ........................... 385/27 |
| 6,788,418 | B1 | * | 9/2004  | Kringlebotn .................. 356/477 |
| 6,822,218 | B2 | * | 11/2004 | Helmig et al. ........... 250/227.18 |

(Continued)

OTHER PUBLICATIONS

M.M. Molenaar, et al., "First Downhole Application of Distributed Acoustic Sensing (DAS) for Hydraulic Fracturing Monitoring and Diagnostics", Society of Petroluem Engineers, 2011, pp. 1-9, SPE 140561.

(Continued)

*Primary Examiner* — Helen Kwok
(74) *Attorney, Agent, or Firm* — Sughrue Mion, PLLC

(57) ABSTRACT

Optical pulses are output from a light source to an optical fiber at one selected emission wavelength, a reflection light reflected at a fiber Bragg grating at the optical fiber is received at an optical receiver and is converted to a reflection signal by an optical to electrical conversion, a fiber Bragg grating which reflects the reflection light is identified by the signal processing unit when an intensity of the reflection signal obtained by the optical receiver is over a predetermined threshold value, and a measurement step that calculates acoustic frequencies at the fiber Bragg grating based on a temporal change of the intensity of the reflection signal at the fiber Bragg grating is repeated more than two times while changing an emission wavelength of the light source. The acoustic frequency at each fiber Bragg grating is calculated to determine an acoustic distribution along a longitudinal direction of the fiber.

10 Claims, 10 Drawing Sheets

(56) References Cited

U.S. PATENT DOCUMENTS

| | | | |
|---|---|---|---|
| 6,879,742 B2 * | 4/2005 | Chi et al. | 385/12 |
| 7,206,509 B2 * | 4/2007 | Beacken | 398/53 |
| 7,268,884 B2 * | 9/2007 | Kringlebotn et al. | 356/477 |
| 8,076,909 B2 * | 12/2011 | Diatzikis et al. | 322/99 |

OTHER PUBLICATIONS

Yuelan Lu, et al., "Vibration Monitoring with High Frequency Response Based on Coherent Phase-Sensitive OTDR Method", Proc. of SPIE, 2011, pp. 77533K-1 to 77533K-4, vol. 7753.

* cited by examiner

METHOD OF MEASURING ACOUSTIC DISTRIBUTION AND DISTRIBUTED ACOUSTIC SENSOR

This application is a non-provisional application claiming priority to and the benefit of U.S. provisional application No. 61/654,472, filed Jun. 1, 2012. The entire contents of which are incorporated herein by reference.

BACKGROUND OF THE INVENTION

1. Field of the Invention

The present invention relates to a method of measuring an acoustic distribution and a distributed acoustic sensor.

2. Description of Related Art

In order to search and extract resources such as oil or gas (natural gas or shale gas), distributed measurement technologies using an optical fiber sensor are utilized. As an optical fiber sensor, there are Distributed Temperature Sensing (DTS), Distributed Strain Sensing (DSS), Distributed Acoustic Sensing (DAS), and so on.

For example, in "First Downhole Application of Distributed Acoustic Sensing (DAS) for Hydraulic-Fracturing Monitoring and Diagnostics," M. M. Molenaar et al., Society of Petroleum Engineers, SPE 140561, a distributed acoustic sensor which is configured using a Coherent Optical Time Domain Reflectometry (COTDR) and a conventional single-mode fiber is disclosed. However, a COTDR has a complex structure and requires a lot of expensive optical components.

The present invention has been made in view of the above-described circumstances, and has an object to provide a method of measuring an acoustic distribution and a distributed acoustic sensor which are capable of measuring an acoustic distribution without using a coherent detection method.

SUMMARY

A method of measuring an acoustic distribution according to an aspect of the present invention includes: using a distributed acoustic sensor which includes: a light source unit which is capable of emitting optical pulses at two or more emission wavelengths; an optical fiber which includes two or more fiber Bragg gratings disposed between a first end of the optical fiber and a second end of the optical fiber along a longitudinal direction of the optical fiber, the first end being close to the light source unit and the second end being far from the light source unit; an optical receiver unit, which receives a reflection light emitted from the light source unit and reflected at one or more of the two or more fiber Bragg gratings and which converts the reflection light to a reflection signal by an optical to electrical conversion; a light branching unit which separates a light output from the light source unit into a measurement light which is directed to the two or more fiber Bragg gratings and a reference light which is to be converted to a reference signal by an optical to electrical conversion without reaching any of the two or more fiber Bragg gratings; and a signal processing unit analyzing the reflection signal and the reference signal; and calculating acoustic frequencies for all the two or more fiber Bragg gratings disposed at the optical fiber to determine an acoustic distribution along a longitudinal direction of the optical fiber, by repeating a measurement step more than two times while changing an emission wavelength of the light source unit, the measurement step including: outputting two or more optical pulses from the light source unit to the optical fiber at intervals, two or more optical pulses having one emission wavelength selected from among the two or more emission wavelengths; identifying a fiber Bragg grating, which reflects a reflection light corresponding to the reflection signal, among the two or more fiber Bragg gratings by the signal processing unit based on a time difference between when the reflection signal is detected and when the reference signal is detected in a case where a reflection signal intensity obtained by the optical receiver unit is over a predetermined threshold value, and obtaining a temporal change of a reflection signal intensity at the identified fiber Bragg grating; and calculating an acoustic frequency at the identified fiber Bragg grating based on the temporal change of the reflection signal intensity, where: at the light source unit, a difference of two different emission wavelengths arbitrarily selected from among the two or more fiber Bragg gratings is greater than a maximum value $\Delta\lambda a$ of a wavelength width of an optical pulse output at each of the two or more emission wavelengths; and at the optical fiber, a minimum value $\Delta\lambda b$ of a reflection bandwidth of the two or more fiber Bragg gratings is greater than the maximum value $\Delta\lambda a$ of the wavelength width.

The measurement step may be repeated so as to use all the two or more emission wavelengths.

The method may include determining whether or not the signal processing unit calculates the acoustic frequencies at all the two or more fiber Bragg gratings disposed at the optical fiber, where when it is determined that the acoustic frequencies at all the two or more fiber Bragg gratings are calculated by the signal processing unit, the measurement step may not be repeated.

The distributed acoustic sensor may include a second optical receiver unit which receives the reference light and converts the reference light to the reference signal by an optical to electrical conversion; and the light branching unit may be a light splitting unit which is disposed between the light source unit and the first end and capable of branching a light output from the light source unit into the reference light which is directed to the second optical receiver unit and the measurement light which is directed to the first end.

The light branching unit may be a partial reflection unit which is disposed at the optical fiber and capable of partially reflecting a light as the reference light at all the two or more emission wavelengths; and the optical receiver unit may receive the reference light and the reflection light.

A distributed acoustic sensor according to an aspect of the present invention includes: a light source unit which is capable of emitting optical pulses at two or more emission wavelengths and outputting two or more optical pulses at each of the emission wavelengths, the two or more optical pulses being output at intervals; an optical fiber which includes two or more fiber Bragg gratings disposed between a first end of the optical fiber and a second end of the optical fiber along a longitudinal direction of the optical fiber, the first end being close to the light source unit and the second end being far from the light source unit; an optical receiver unit, which receives a reflection light emitted from the light source unit and reflected at one or more of the two or more fiber Bragg gratings and which converts the reflection light to a reflection signal by an optical to electrical conversion; a light branching unit which separates a light output from the light source unit into a measurement light which is directed to the two or more fiber Bragg gratings and a reference light which is to be converted to a reference signal by an optical to electrical conversion without reaching any of the two or more fiber Bragg gratings; a signal processing unit being configured to identify a fiber Bragg grating, which reflects a reflection light corresponding to the reflection signal, among the two or more fiber Bragg gratings based on a time difference between when the reflection signal is detected and when the reference signal is detected in a case where a reflection signal intensity obtained by the optical receiver unit is over a predetermined threshold value, and to obtain a temporal change of a reflection signal intensity at the identified fiber Bragg grating; and a control unit being configured to calculate acoustic frequencies for all the two or more fiber Bragg gratings disposed at the optical fiber to determine an acoustic distribution along a longitudinal direction of the optical fiber, by repeating a measurement step more than two times while changing an emission wavelength of the light source unit, the measurement step including: outputting two or more optical pulses from the light source unit to the optical fiber at intervals, the two or more optical pulses having one emission wavelength selected from among the two or more emission wavelengths; identifying a fiber Bragg grating, which reflects a reflection light corresponding to the reflection signal, among the two or more fiber Bragg gratings by the signal processing unit in a case where a reflection signal intensity obtained by the optical receiver unit is over a predetermined threshold value, and obtaining a temporal change of a reflection signal intensity at the identified fiber Bragg grating; and calculating an acoustic frequency at the identified fiber Bragg grating based on the temporal change of the reflection signal intensity, where: at the light source unit, a difference of two different emission wavelengths arbitrarily selected from among the two or more fiber Bragg gratings is greater than a maximum value $\Delta\lambda a$ of a wavelength width of an optical pulse emitted at each of the two or more emission wavelengths; and at the optical fiber, a minimum value $\Delta\lambda b$ of a reflection bandwidth of the two or more fiber Bragg gratings is greater than the maximum value $\Delta\lambda a$ of the wavelength width.

The control unit may be configured to repeat the measurement step so as to use all the two or more emission wavelengths.

The control unit may be configured to determine whether or not the signal processing unit calculates the acoustic frequencies at all the two or more fiber Bragg gratings disposed at the optical fiber, and when it is determined that the acoustic frequencies at all the two or more fiber Bragg gratings are calculated by the signal processing unit, the measurement step is not repeated.

The distributed acoustic sensor may further include a second optical receiver unit which receives the reference light and converts the reference light to the reference signal by an optical to electrical conversion, where the light branching unit may be a light splitting unit that is disposed between the light source unit and the first end and capable of branching a light output from the light source unit into the reference light which is directed to the second optical receiver unit and the measurement light which is directed to the first end.

The light branching unit is a partial reflection unit which may be disposed at the optical fiber and capable of partially reflecting a light as the reference light at all the two or more emission wavelengths; and the optical receiver unit may receive the reference light and the reflection light.

According to the above-described aspects of the present invention, it is possible to provide a method of measuring an acoustic distribution and a distributed acoustic sensor which are capable of measuring an acoustic distribution without using a coherent detection method.

DETAILED DESCRIPTION

Hereinbelow, exemplary embodiments of the present invention are described with reference to the drawings.

Figure 1:
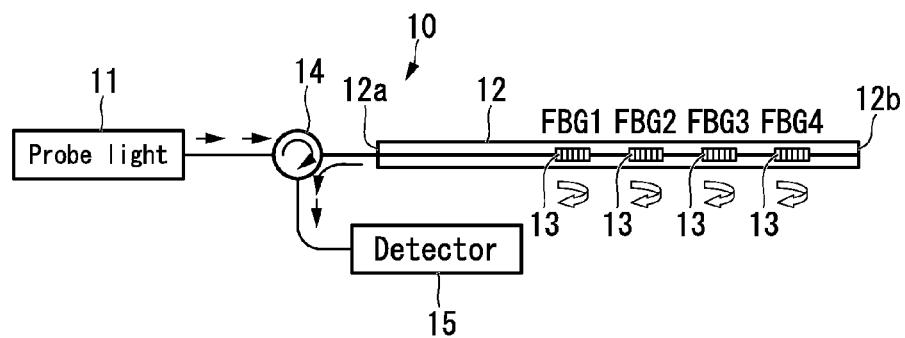
FIG. 1 is a schematic diagram showing an example of a distributed acoustic sensor.

In FIG. 1, an example of a distributed acoustic sensor using fiber Bragg gratings (FBGs) is shown. The distributed acoustic sensor 10 includes a wavelength-tunable light source unit 11, an optical fiber 12 which has two or more fiber Bragg gratings 13, 13, . . . , a circulator 14 which inputs a measurement light output from the light source unit 11 to the optical fiber 12 and outputs a reflection light returned from the optical fiber 12 toward an optical receiver unit 15 described hereinafter, and the optical receiver unit 15 which receives a reflection light reflected at the fiber Bragg gratings 13 and which converts the reflection light to a reflection signal by an optical to electrical conversion.

The optical fiber 12 includes a first end 12a which is close to the light source unit 11 and a second end 12b which is far from the light source unit 11. The fiber Bragg gratings 13 are disposed in order from the first end 12a to the second end 12b along a longitudinal direction. Since the second end 12b of the optical fiber 12 is entered in a measurement object such as an oil well, the second end 12b may be a free end. In order to prevent a reflection at the second end 12b, the second end 12b may be an antireflection end. Each of the fiber Bragg gratings 13, 13, . . . , may have the same characteristics such as a reflection wavelength, reflectivity, and a temperature dependence.

The optical receiver unit 15 receives a light (a reflection light) reflected inside the optical fiber 12 and converts the light to a reflection signal by an optical to electrical conversion. The reflection signal is an electrical signal which is capable of representing a reflection light intensity. The representation method of a reflection light intensity of a reflection signal is not particularly limited; however, analog data using values of parameters such as a voltage value or a current value without any changes are preferable, since the processing time can be shortened. Digital data where parameters such as a voltage value or a current value representing a reflection light intensity are further allocated to an arbitrary bit number can also be employed. As the optical receiver unit 15, a light receiving element (a light detection unit) such as a photodiode can be used.

The reflection light received at the optical receiver unit 15 may include a reflection light which is generated such that the measurement light is partially reflected at each (or all) of the two or more fiber Bragg gratings 13, 13, . . . , The received reflection light may include a reflection light generated by being reflected at some of the two or more fiber Bragg gratings 13, 13, . . . , (i.e., one or more fiber Bragg gratings 13). In addition, when a measurement wavelength generated at the light source unit and a reflection wavelength of the FBGs are greatly different, it is possible that in a reflection light received at the optical receiver unit, a reflection light generated by being reflected at the fiber Bragg gratings are not included.

Figure 2:
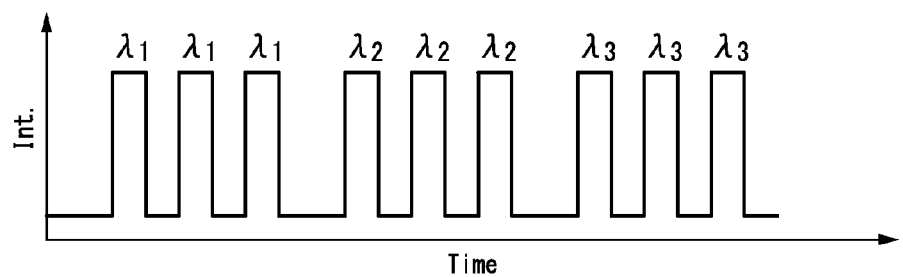
FIG. 2 is a schematic diagram showing an example of optical pulses generated by a light source unit.

In FIG. 2, an example of optical pulses generated by the wavelength-tunable light source unit 11 is shown. The wavelength-tunable light source unit 11 can emit optical pulses at two or more emission wavelengths. A light output from the light source unit 11 to the optical fiber 12 includes two or more optical pulses which have a different emission wavelength (a center wavelength of the output light). For example, when using three emission wavelengths $\lambda 1$, $\lambda 2$, and $\lambda 3$ after two or more optical pulses with the first wavelength $\lambda 1$ are output, two or more optical pulses with the second wavelength $\lambda 2$ are output, and then, two or more optical pulses with the third wavelength $\lambda 3$ are output. Two or more optical pulses with the same wavelength are continuously generated. As this duration, the time which is necessary for measuring an acoustic distribution of a desired frequency range is ensured. For example, when observing the vibration approximately from 10 Hz to 10 kHz, since the time required for one cycle of the vibration is approximately from 0.1 sec to 0.1 msec, an acoustic frequency can be determined using particular only one wavelength if the duration is approximately 1 sec.

Figure 3:
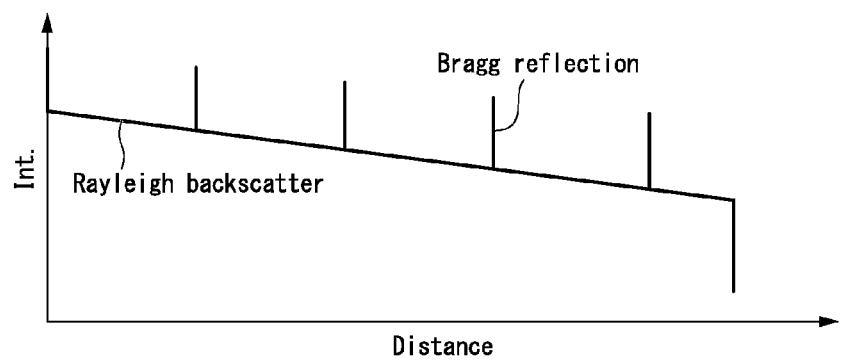
FIG. 3 is a schematic diagram showing an example of reflection intensities of an ODTR.

In FIG. 3, an example of reflection intensities by an Optical Time Domain Reflectometry (OTDR) is shown. Each time when one optical pulse is input to the optical fiber 12 from the first end 12a, a part of the input light is reflected at each point of the optical fiber. The reflection light is observed at the optical receiver unit 15. The longer distance is required, the longer time for propagating the right forward and backward to the optical fiber is required; therefore, the distance of the horizontal axis in FIG. 3 is proportional to the time until receiving the reflection light. Among Rayleigh scatter generated in the optical fiber, backscatter components scatter in an opposite propagating direction of the optical pulse, and returns to the light receiver unit and being observed. In addition, a Bragg reflection occurs at each FBG, and provides a larger reflection intensity than a reflection intensity caused by Rayleigh scatter. The longer the distance is, the more the measurement light is attenuated; therefore, the reflection intensity tends to be smaller in accordance with the distance. At the second end, by forming the optical fiber to be an antireflection end, a reflection intensity is remarkably reduced at a position corresponding to the second end. Therefore, a reflection light further than the second end is not observed.

Figure 4:
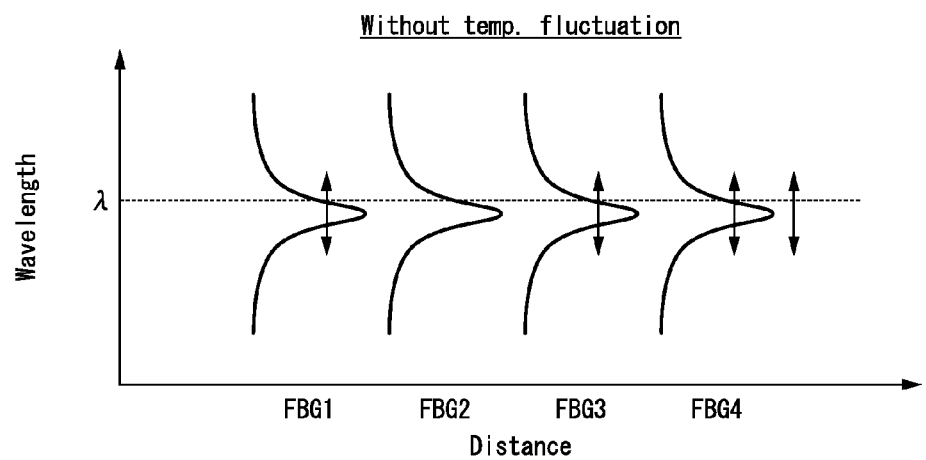
FIG. 4 is a schematic diagram showing an example of Bragg wavelength shifts of fiber Bragg gratings due to vibration without a temperature fluctuation.

In FIG. 4, an example of Bragg wavelength shifts of the FBGs due to the vibration without a temperature fluctuation along a longitudinal direction of the optical fiber is shown. A wavelength of the measurement light (optical pulses) is described as a measurement wavelength $\lambda$. The horizontal axis represents a distance with respect to the FBGs1-4; however, referring to each position of the FBGs1-4, the reflection spectra are shown with the vertical axis representing a wavelength and the horizontal axis representing a relative reflection intensity. Each reflection spectrum has a center wavelength (the wavelength at which the reflection intensity is the largest) of the Bragg reflection close to $\lambda$. The center wavelength of the reflection at the FBG fluctuates due to a temperature or a strain added to the optical fiber. The vibration can be understood as increasing and decreasing of a periodical strain. In the vicinity of the center wavelength of the reflection, the reflection intensity variations in accordance with a difference between the measurement wavelength $\lambda$ and the center wavelength of the reflection along with the Bragg wavelength shifts of the FBGs due to the vibration. Therefore, the acoustic frequency can be determined by analyzing the temporal change of the reflection intensity. Even when temperature influence is added to the optical fiber, since the temporal change of the temperature does not have high frequencies such as in a case of vibration, most of the temperature influence can be neglected in the temporal change of the reflection intensity occurred in the short period of time.

Figure 5:
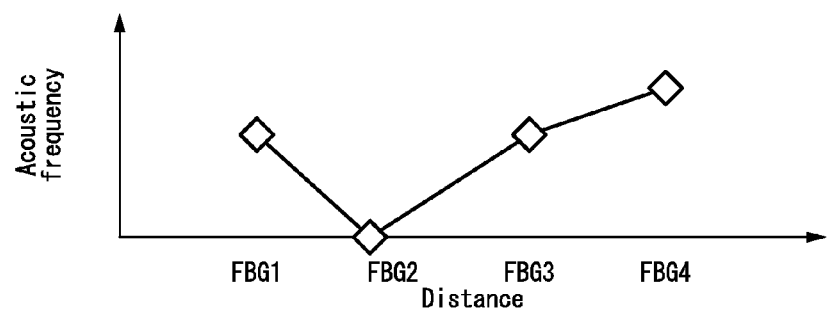
FIG. 5 is a schematic diagram showing an example of an acoustic distribution.

In FIG. 5, an example of an acoustic distribution is shown. In above-described FIG. 4, relatively slow vibration is provided with the FBG1 and the FBG3 where one double-headed arrow is shown, relatively fast vibration is provided with the FBG4, where two double-headed arrows are shown, and little vibration is provided with the FBG2, where no double-headed arrow is shown. An acoustic distribution corresponding to the above is shown in FIG. 5. By combining a distance to each of the FBGs with the temporal change of the reflection intensity, the acoustic distribution can be determined as a shift of an acoustic frequency with respect to the distance.

Figure 6:
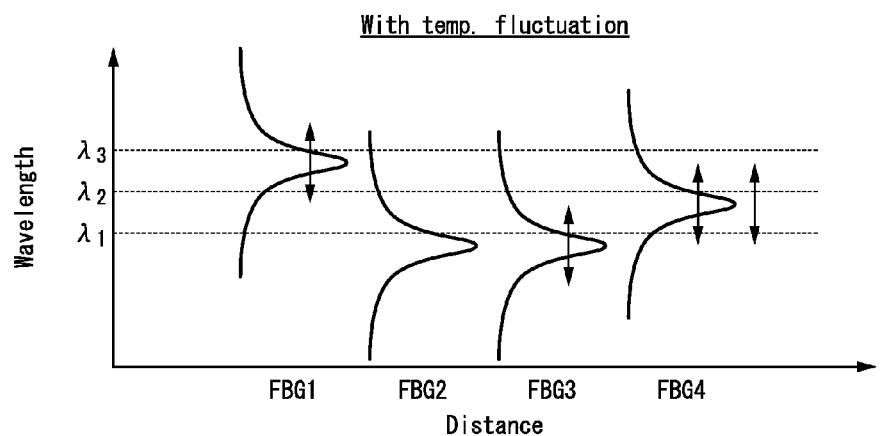
FIG. 6 is a schematic diagram showing an example of Bragg wavelength shifts of fiber Bragg gratings due to vibration with a temperature fluctuation.

In FIG. 6, an example of Bragg wavelength shifts of the FBGs due to vibration with a temperature fluctuation is shown. In FIG. 6, in the same manner as shown in FIG. 4, reflection spectra of the FBG1 to the FBG4 are shown in one diagram. When a temperature fluctuation along a longitudinal direction of the optical fiber is large, the center wavelength of the reflection of each of the FBGs shifts in accordance with temperature differences. When one wavelength, for example, only λ1 is used as a measurement wavelength, even though the temporal changes of the reflection intensity at the FBG2 or the FBG3 can be observed, it is possible that the changes of the reflection intensity at the FBG1 or the FBG4 cannot be observed.

Next, when a wavelength different from λ1, for example, measurement wavelength λ2 is used for the measurement, the center wavelength of the reflection at the FBG4 is close to λ2. In the second measurement, although the temporal changes of the reflection intensity at the FBG4 can be observed, it is possible that the changes of the reflection intensity at the FBGs1, 2, and 3 cannot be observed.

Next, when a wavelength different from λ1 and λ2, for example, measurement wavelength λ3 is used for the measurement, the center wavelength of the reflection at the FBG1 is close to λ3. In the third measurement, although the temporal changes of the reflection intensity at the FBG1 can be observed, it is possible that the changes of the reflection intensity at the FBGs 2, 3, and 4 cannot be observed.

An acoustic frequency at each of the FBG1 to the FBG4 can be determined such that all temporal changes of the reflection intensities of the FBG1 to the FBG4 are observed by combining three measurement results at measurement wavelengths λ1, λ2, and λ3. As a result, an acoustic distribution similar to shown in FIG. 5 can be obtained. Here, in FIG. 6, λ1<λ2<λ3 is satisfied. In the descriptions mentioned above, the measurement is performed in the order of λ1, λ2, and λ3; however, the selection of a measurement wavelength among a plurality of measurement wavelengths and the order of the selection is optional.

Although depending on characteristics of the light source unit, when a relatively long time is required for greatly shifting a measurement wavelength, it is preferable for the shift of the measurement wavelength to be minimized. In other words, when n kinds of measurement wavelengths which satisfy the relationship: λ1<λ2<λ3< ... <λn−1<λn are used, it is preferable that the wavelengths are shifted from a shorter wavelength side to a longer wavelength side such as λ1, λ2, λ3, .... As for the relationship of L/S, λn−1, λn in ascending order or in an opposite manner, the wavelengths are shifted from a longer wavelength side to a shorter wavelength side such as λn, λn−1, ..., λ3, λ2, λ1 in descending order.

Figure 7:
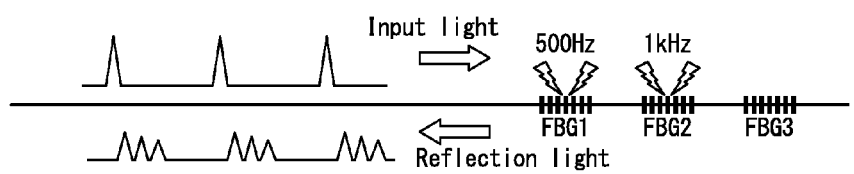
FIG. 7 is a schematic diagram showing an example of a configuration for inputting two or more optical pulses to an optical fiber to obtain a reflection light.

The measurement principle of an acoustic distribution is described in more detail. In FIG. 7, an example of a configuration for inputting two or more optical pulses having the same wavelength to an optical fiber to obtain a reflection light is shown. At the left side of FIG. 7, a light source unit is arranged (not shown), and an optical pulses as an incident light is input to the FBGs at the right side of FIG. 7. In FIG. 7, the FBG4 is omitted and three FBGs 1, 2, and 3 are shown. In this example, relatively slow vibration is induced in the FBG1, relatively fast vibration is induced in the FBG2, and little vibration is induced in the FBG3. As described with reference to FIG. 4, when the temperature fluctuation can be neglected, measured reflection light includes reflection lights reflected at each FBG (the reflection light reflected at the FBG1, the reflection light reflected at the FBG2, and the reflection light reflected at the FBG3). Meanwhile, the Rayleigh scattered light described using FIG. 3 has fairly small intensities comparing to the Bragg reflection light, and the Rayleigh scattered light is not used; therefore, it is omitted from FIG. 7. The same holds for the drawings described hereinbelow.

Figure 8:
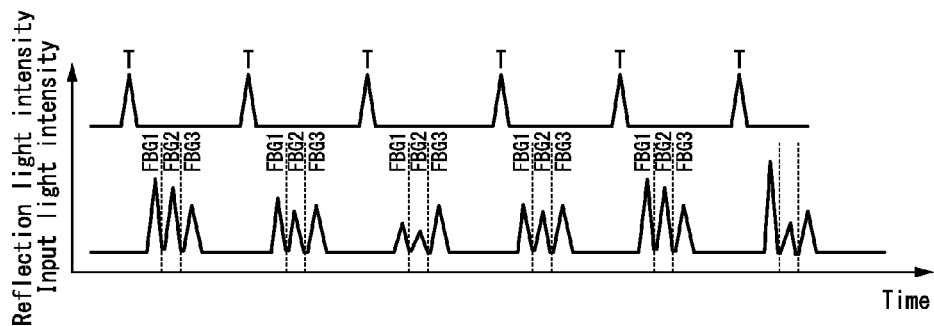
FIG. 8 is a schematic diagram showing an example of temporal changes of an input light intensity and a reflection light intensity.

In FIG. 8, an example of intensity variation of an input light and a reflection light is shown. The notes of the FBG1, the FBG2, and the FBG3 are respectively added to show temporal changes of the reflection intensities due to the FBGs 1-3. Each peak of the reflection intensities due to FBGs 1-3 is detected in an earlier stage if each FBG is arranged closer to the light source unit. A peak of the intensity variation of the input light is detected in the earliest stage since the distance from the light source unit corresponds to zero. Therefore, a peak of the intensity variation of the input light can be used as a trigger signal (T) to distinguish FBGs 1-3. In particular, the input light is partially taken out as a reference light, and this reference light is used as a trigger signal. As shown in FIG. 4, the trigger signal is not required when a temperature is not fluctuated and the reflection lights from all the FBGs can be received. However, as shown in FIG. 6, the trigger signal is useful when a temperature is fluctuated and the reflection lights from all the FBGs cannot be received.

Figure 9:
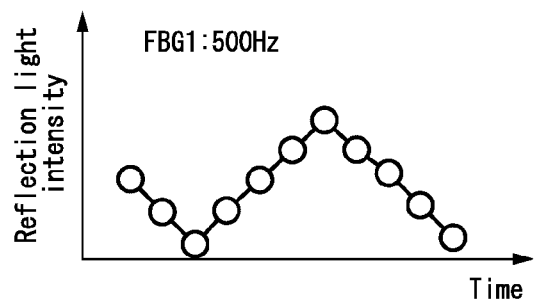
FIG. 9 is a schematic diagram showing an example of a temporal change of a reflection light intensity at the FBG1.
Figure 10:
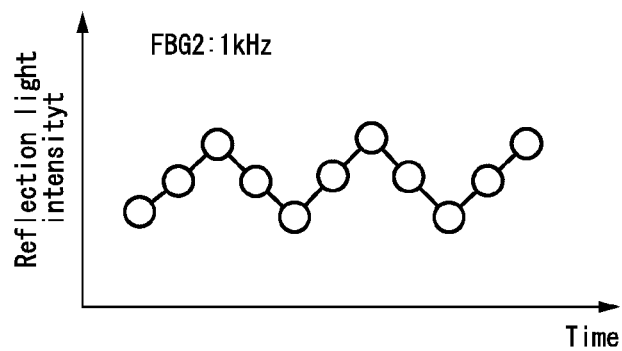
FIG. 10 is a schematic diagram showing an example of a temporal change of a reflection light intensity at the FBG2.
Figure 11:
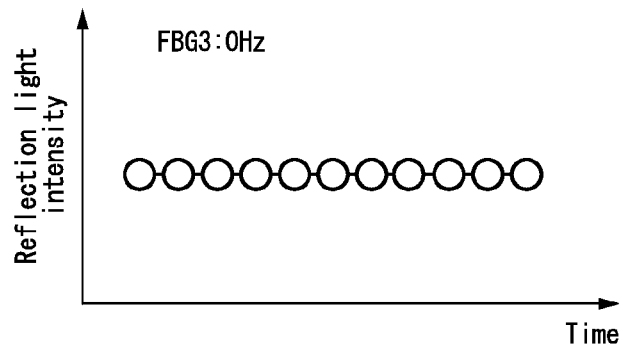
FIG. 11 is a schematic diagram showing an example of a temporal change of a reflection light intensity at the FBG3.

In FIG. 9, an example of a temporal change of a reflection light intensity at the FBG1 is shown. This intensity variation is obtained by extracting an intensity variation of the reflection light due to the FBG1 among the intensity variations of the reflection lights shown in FIG. 8. However, in FIG. 9, a greater number of peaks of the reflection intensities are counted than the number of peaks shown in FIG. 8. Similarly, an extracted intensity variation of the reflection light due to the FBG2 is shown in FIG. 10, and an extracted intensity variation of the reflection light due to the FBG3 is shown in FIG. 11.

As shown in FIG. 9, in the FBG1 with which the relatively slow vibration is induced, the intensity variations of the reflection light also show a relatively slow vibration. As shown in FIG. 10, in the FBG2 with which the relatively fast vibration is induced, the intensity variations of the reflection light also show a relatively fast vibration. As shown in FIG. 11, in the FBG3 with which little vibration is induced, the intensity variations of the reflection light also show temporally little vibration. In addition, a frequency of the intensity variations of the reflection light matches well with a frequency of vibration induced in each FBG.

According to the configuration described above, it is shown that an acoustic distribution along the optical fiber can be measured under a temperature fluctuation condition, by using a general device which is configured such that a general optical fiber including a plurality of FBGs is combined with OTDR equipment (an example of the optical fiber is that an optical fiber which is generally used as a single-mode optical fiber for telecommunication, has a cladding made of pure silica glass and a core made of germanium-doped silica glass, has relative refractive index difference (Δ) between the core and the cladding of approximately 0.3%, and has a cladding diameter of 125 μm) Since a coherent detection method is not required, an acoustic distribution can be measured by using inexpensive equipment.

Figure 12:
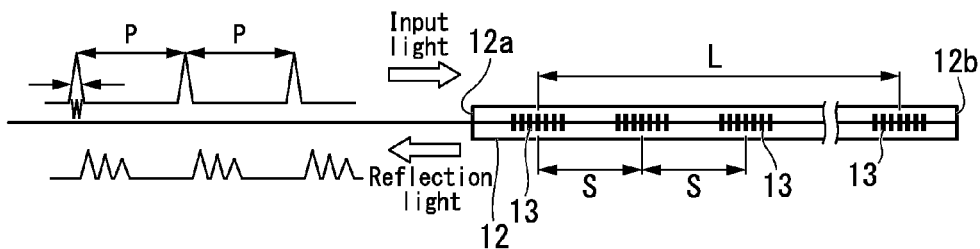
FIG. 12 is a schematic diagram showing some parameters which should be considered when performing a measurement of an acoustic distribution according to the present invention.

In FIG. 12, some parameters which should be considered when performing a measurement of an acoustic distribution according to the present invention are shown.

The total length of the optical fiber 12 (the length from the first end 12a to the second end 12b) is determined in accordance with a measurement range of an acoustic distribution. However, regarding the length from the first end 12a to an FBG closest to the first end 12a and the length from the second end 12b to an FBG closest to the second end 12b, they are not necessarily the length which can be neglected, and may be a significant length with respect to the total length of the fiber. As a result, the measurement range of an acoustic distribution is related to a range where the FBGs are distributed (an FBGs distribution range) L.

A repetition frequency of input pulses is an inverse number of a time interval P of the input pulses (1/P). In detail, the time interval P is a repetition frequency (time) of the optical pulses when the light source unit outputs two or more optical pulses for the same emission wavelength. In other words, the time interval of the optical pulses when the light source unit changes the emission wavelength may be larger than the time interval P. As it is understand from the method described with reference to FIGS. 8-11, one vibration period can be determined as the integral multiple of the time interval P. In other words, it is necessary for the repetition frequency of the input pulses to be sufficiently greater than the acoustic frequency desired to be measured.

An interval S between the FBGs adjacent to each other (an FBG interval) corresponds to spatial resolution in the measurement of an acoustic distribution. When the number of FBGs is N, a ratio between the FBG distribution range L and the FBG interval S (i.e., L/S) corresponds to N−1. For example, when 1,000 FBGs are disposed in the optical fiber, L/S also needs to be approximately 1,000.

When the optical pulses with the time interval P is input to the optical fiber, a peak of a reflection intensity for the same FBG in the reflection light also appears repeatedly at the interval which is approximately the same as the time interval P. However, as described above, if the difference between the measurement wavelength and the reflection wavelength of the FBGs is large due to the temperature fluctuation around the optical fiber 12, it is possible that some of or all of the reflection peaks does not appear. If Bragg reflection lights are returned from all FBGs, peaks of the reflection intensity of the same number as the FBGs that appear side by side within the range of the time interval P are observed. The duration of the reflection peaks are approximately the same as the duration W of the input pulses. The duration of each of these peaks are represented by, in general, full width at half maximum (FWHM) when the time is shown in a horizontal axis and the intensity is shown in a vertical axis.

The FBG interval S may not to be constant; however, it is desirable to determine a minimum value of the FBG interval S in accordance with W. If the duration W of the input pulses is long, the duration of the reflection peaks is also long, and in other words, the reflection peaks broaden on the time axis. If the adjacent reflection peaks overlaps, it is possible that the distinction between the adjacent reflection peaks become difficult. Therefore, a ratio between the time interval P of the input pulses and the duration W (P/W) is preferably N−1 or more where the number of FBGs is represented by N.

As for the relationship of L/S described above, it is preferable to satisfy P/W≥L/S. By deforming this inequality expression, W≤P×(S/L) is provided. In other words, if the time interval P of the input pulses, the FBG distribution range L, and the FBG interval S are given, P×(S/L) provides a preferable upper limit of the duration W of the input pulses. If narrowing the duration W is constrained, the time interval P may be longer. However, an increase of the time interval P influences the entire measurement time and also a measureable acoustic frequency range. Therefore, it is desirable to use the light source which can generate pulses with sufficiently short duration W.

As an example, an optical fiber which has the total fiber length of approximately 5 km, 1000 FBGs, and the FBG interval (spatial resolution) of 5 m is used. When the repetition frequency of the input pulses is 20 kHz, the time interval P of the input pulses is 50 μm (microsecond), the duration W of the input pulses is 50 ns (nanosecond) or less. If an acoustic frequency to be measured is approximately 1000 Hz or less, it is sufficiently measurable.

Although the total length of the fiber is not particularly limited, it is preferable to be 1-10 km. The intervals between the FBGs are not particularly limited; however, it is preferable to be 1-10 m.

In the present invention, as described with reference to FIG. 6, if the difference between the measurement wavelength and the reflection wavelength of the FBGs is large due to the temperature fluctuation around the optical fiber, the reflection peaks are sometimes not detected since sufficient reflection intensities cannot be obtained at a particular measurement wavelength. In order to solve the problem, it is necessary to repeat the measurement with shifting the measurement wavelength.

In the descriptions hereinbelow, as a matter of convenience, in the light source in which n kinds of measurement wavelengths ($\lambda 1, \lambda 2, \lambda 3, \ldots, \lambda n-1, \lambda n$) are usable, suffixes are attached in ascending order in accordance with the wavelength order such as $\lambda 1 < \lambda 2 < \lambda 3 < \ldots < \lambda n-1 < \lambda n$.

In order for wavelengths $\lambda 1, \lambda 2, \lambda 3, \ldots, \lambda n-1, \lambda n$ to be distinctive each other, it is desirable that the difference between each of the wavelengths is larger than a predetermined value. In general, in the case of a wavelength spectrum of the light output from the light source emitting at a single wavelength, a peak with a fairly narrow wavelength width is provided. Here, the wavelength width is represented by full width at half maximum (FWHM) when the wavelength is shown in a horizontal axis and the intensity is shown in a vertical axis. The wavelength widths of the emission wavelengths $\lambda 1, \lambda 2, \ldots, \lambda n$ are respectively represented by wavelength widths $\Delta\lambda 1, \Delta\lambda 2, \ldots, \Delta\lambda n$. A condition for the wavelength widths not to overlap each other is represented by the following equation (1).

$$\lambda i-1 + \Delta\lambda i-1/2 < \lambda i - \Delta\lambda i/2 \tag{1}$$

(Note that i is an arbitrary integer satisfying 2≤i≤n.)

The equation (1) is equivalent to $\lambda i - \lambda i-1 > (\Delta\lambda i-1 + \Delta\lambda i)/2$. Here, when the maximum value of the wavelength widths $\Delta\lambda 1, \lambda 2, \ldots, \lambda n$ is represented by $\Delta\lambda a$, if the relationship $\lambda i - \lambda i-1 > \Delta\lambda a$ is satisfied, $\Delta\lambda a \geq (\Delta\lambda i-1 + \Delta\lambda i)/2$ is satisfied. Therefore, if the following equation (2) is satisfied, the above-described equation (1) is also satisfied.

$$\lambda i - \lambda i-1 > \Delta\lambda a \tag{2}$$

(Note that i is an arbitrary integer satisfying 2≤i≤n.)

In addition, if the following equation (3) is satisfied, since the above-described equation (2) is satisfied, the equation (1) is also satisfied. Here, |X| represents an absolute value of X.

$$|\lambda i - \lambda j| > \Delta\lambda a \tag{3}$$

(Note that i is an arbitrary integer satisfying 1≤i≤n, and j is an arbitrary integer satisfying 1≤j≤n and i≠j.)

In other words, as a condition equivalent to the equation (3), in the light source unit, if the maximum value of the wavelength width when the two or more emission wavelengths are emitted at each of the wavelengths is represented by $\Delta\lambda a$, a difference of two different wavelengths arbitrarily selected from among the two or more emission wavelengths is preferably greater than a maximum value $\Delta\lambda a$ of the wavelength width. As a result, since the above-described equation (1) is satisfied, the number n of the different emission wavelengths does not unnecessarily increase. In other words, it is preferably efficient to provide the wavelength difference which is large to some extent in accordance with the equations (1)-(3). Note that even when the emission wavelength is shifted by a small wavelength difference such as $\Delta\lambda a$ or less and moreover, the measurement is repeated with the same emission wavelength, the effect of the present invention is not inhibited as long as the measurement number does not enormously increase. When the measurement number enormously increases, the condition of the vibration around the optical fiber may change during the measurement, and the changes sometimes influence an accuracy of the acoustic distribution.

When the wavelength difference of the measurement wavelengths is small, it may be possible that the FBGs can be detected at several measurement wavelengths. In this case, the process such as averaging the results of measuring vibration at the several measurement wavelengths or focusing on a particular wavelength having the highest reflection light intensity may be performed.

In addition, reflection bandwidths of each FBG can be shifted in accordance with manufacturing (designing) conditions such as a grating length or reflectivity. When a minimum value of the reflection bandwidth of an FBG is represented by $\Delta\lambda b$, the minimum value $\Delta\lambda b$ of the reflection bandwidth needs to be larger than the maximum value $\Delta\lambda a$ of the wavelength width described above. If the reflection bandwidth is enormously narrow, even when a light with a wavelength fairly close to a center wavelength of the reflection is input to an optical fiber as a measurement light, there may be no intensity variations of the reflection lights depending on wavelength shifts along with an FBG vibration. Therefore, it is preferable to satisfy at least the relationship $\Delta\lambda b > \Delta\lambda a$. In the case of usual FBGs, a light source with sufficiently small $\Delta\lambda a$ may be used since the FBGs have relatively large reflection bandwidths. If a light source with enormously large wavelength widths such as $\Delta\lambda b < \Delta\lambda a$ is used, intensity variations of the reflection lights depending on the wavelength shifts along with an FBG vibration do not occur, and the FBG vibration may not be identified.

It is desirable to take into consideration for the increase of the wavelength difference of the measurement wavelengths. Regarding a difference between two wavelengths adjacent to each other and represented by $\lambda 2-\lambda 1, \lambda 3-\lambda 2, \ldots, \lambda n-\lambda n-1$, if any one of or any two or more of the differences are enormously large, a center wavelength of the reflection of either FBG falls into the large wavelength difference at a particular temperature. As a consequence, it is possible not to detect reflection peaks of the FBG at none of the emission wavelengths. Therefore, it is preferable to provide a predetermined lower limit for the wavelength difference. When the minimum wavelength difference is represented by $\Delta\lambda c$, it corresponds to a minimum value of $|\lambda j|$ which is used in the equation (3). If $\Delta\lambda c$ does not depend on the order of $\lambda 1, \lambda 2, \ldots, \lambda n$, $\Delta\lambda c$ can be defined as a minimum value of a difference of two different wavelengths arbitrarily selected from among the two or more emission wavelengths.

In terms of the above, it is not preferable that the minimum wavelength difference $\Delta\lambda c$ of the measurement light is enormously larger than the wavelength bandwidth $\Delta\lambda b$ of the FBGs. When vibration is induced in the optical fiber, since the reflected wavelength at the FBGs shifts during the vibration, it is possible to measure an acoustic frequency at the FBG as long as a part of a vibration period is observed. However, it is preferable that the vibration is continuously observed in terms of accuracy and certainty of the measurement. Therefore, $\Delta\lambda c \geq \Delta\lambda b > \Delta\lambda a$ may be satisfied; however, it is preferable that $\Delta\lambda b > \Delta\lambda c > \Delta\lambda a$ is satisfied. For example, a specific example of a wavelength difference of the measurement wavelengths is 0.3 nm. In this case, $\Delta\lambda b$ is preferably >0.3 nm, and more preferably $\geq 0.6$ nm; however, even $\Delta\lambda a < \Delta\lambda b \leq 0.3$ nm is satisfied, the measurement can be performed.

It is desirable to take into consideration regarding a range of the measurement wavelengths. When the shortest wavelength used for the measurement is represented by $\lambda 1$ and the longest wavelength is represented by $\lambda n$, the range of the measurement wavelength $\Delta\lambda d$ corresponds to $\lambda n-\lambda 1$. If $\Delta\lambda d$ does not depend on the order of $\lambda 1, \lambda 2, \ldots, \lambda n$, $\Delta\lambda d$ can be defined as a maximum value of a difference of two different wavelengths arbitrarily selected from among the two or more emission wavelengths. If the temperature fluctuation around the optical fiber is small, reflection peaks of all FBGs can be detected even when $\Delta\lambda d$ is small. However, when the temperature fluctuation with respect to positions along the optical fiber or the seasonal temperature fluctuation is large, the measurement wavelength cannot be set close to a center wavelength of the reflection of the FBGs if $\Delta\lambda d$ is small, and the optical receiver unit may not be able to detect the reflection lights by the FBGs.

In terms of the above, it is preferable that the range of the measurement wavelength $\Delta\lambda d$ is set to have a broad range depending on how the center wavelengths of the FBGs shift in the temperature range to be measured. In other words, in the temperature range to be measured, when the center wavelengths of the FBGs shift in a range from $\lambda Bmin$ to $\lambda Bmax$ (note that, $\lambda Bmin < \lambda Bmax$), it is preferable that $\Delta\lambda d$ is larger than $\lambda Bmax-\lambda Bmin$. In addition, it is important that not only $\Delta\lambda d > \lambda Bmax-\lambda Bmin$ is satisfied, but also the range of measurement wavelength $\lambda 1, \lambda 2, \ldots, \lambda n$ includes the range from $\lambda Bmin$ to $\lambda Bmax$. Therefore, it is preferable that the shortest wavelength $\lambda 1$ used for the measurement is shorter than the minimum center wavelength $\lambda Bmin$ of the FBG in the temperature range to be measured, and the longest wavelength $\lambda n$ used for the measurement is longer than the maximum center wavelength $\lambda Bmax$ of the FBG in the temperature range to be measured. For example, a specific example of the temperature range will be 25-300° C., and a specific example of the wavelength range of the measurement wavelength will be 3 nm. They are based on the result that the temperature dependence of the FBGs fabricated in the optical fiber is approximately 10.0 pm/° C., the optical fiber having a cladding made of pure silica glass, a core made of germanium-doped silica glass, relative refractive index difference ($\Delta$) between the core and the cladding of approximately 0.3%, and a cladding diameter of 125 μM. In addition, they are also based on the result that the temperature dependence of the FBGs fabricated in the optical fiber is approximately 10.4 pm/° C., the optical fiber being polyimide-coated and having a diameter of 155 μm. Needless to say, $\Delta\lambda d$ and the range of the measurement wavelengths can be changed appropriately based on the temperature dependence of the FBGs.

Figure 13:
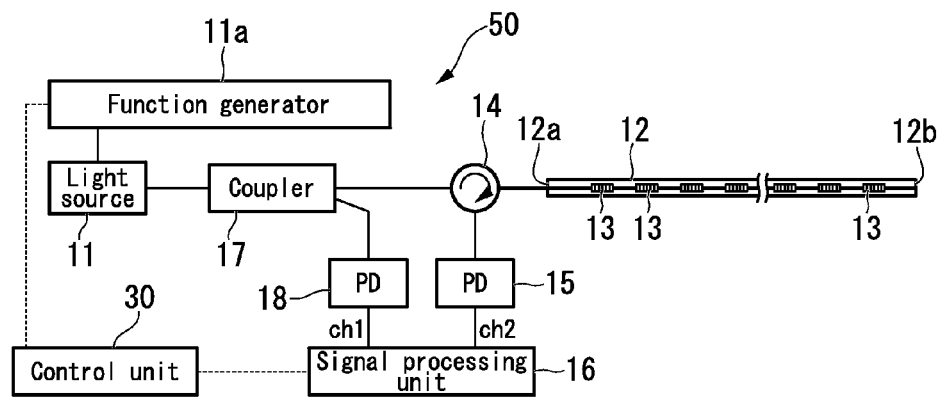
FIG. 13 is a schematic diagram showing a distributed acoustic sensor according to an exemplary embodiment of the present invention.

In FIG. 13, a distributed acoustic sensor 50 according to an exemplary embodiment of the present invention is shown. Comparing to the distributed acoustic sensor 10 shown in FIG. 1, the distributed acoustic sensor 50 is different in that a function generator 11a is connected to the light source unit 11, a signal processing unit 16 is connected to the optical receiver unit 15, a coupler 17 is provided between the light source unit 11 and a circulator 14, the light split at the coupler 17 is received at the second optical receiver unit 18, and so on.

The coupler 17 is a light splitting unit that splits the light output from the light source unit 11 into a measurement light which is directed to the fiber Bragg gratings 13 and a reference light which is to be converted to a reference signal by an optical to electrical conversion without reaching the fiber Bragg gratings 13. The coupler 17 is capable of partially outputting a light output from the light source unit 11 as the reference light to the second optical receiver unit 18 and outputting a measurement light directed to the first end 12a of the optical fiber 12.

The light splitting unit such as the coupler 17 may be disposed between the light source unit 11 and the first end 12a of the optical fiber 12. In other words, the light splitting unit is not limited to be disposed between the light source unit 11 and the circulator 14, and can be disposed between the circulator 14 and the first end 12a. In the former case (see FIG. 13), since the coupler 17 does not exist on a pathway of the reflection light which returns from an FBG, the configuration of the device can be simplified.

The signal processing unit 16 is a device that analyzes reflection signals transmitted from the optical receiver unit 15 and reflection signals transmitted from the second optical receiver unit 18. The reflection signals are generated as electric signals with arbitrarily formats representing an intensity of the reflection light received at the optical receiver unit 15. The reference signals are generated as electric signals with arbitrarily formats representing an intensity of the reference light received at the second optical receiver unit 18. For example, in the case of FIG. 8, signals represented by symbol T correspond to reference signals, and intensities of the reflection lights represented by such as the FBG1 correspond to reflection signals. By converting the light intensities to electric signals, fast execution of the complicated analysis is available.

In addition, by connecting the optical receiver unit 15 and the second optical receiver unit 18 to the same signal processing unit 16, the reference signals and the reflection signals are easily synchronized.

The fundamental principle of an analysis to be executed at the signal processing unit 16 is similar to the descriptions mentioned above with reference to FIGS. 4-11. If it is possible to input and analyze the time when the reference lights are received at the second optical receiver unit, the intensities of the reflection lights, and the time when the reflection lights are received at the optical receiver unit, then in principle, the signal transmission from the optical receiver unit to the signal processing unit is not necessarily performed by electric signals. However, from a practical view point, it is preferable to perform the transmission electrically.

In other words, when the reflection signal intensity obtained by the optical receiver unit 15 is over a predetermined threshold value, the signal processing unit 16 identifies a reflection position which corresponds to the fiber Bragg grating where the reflection signal is reflected based on a time difference between when the reflection signal is detected and when the reference signal is detected. In FIG. 4, it is shown that the sufficient reflection light intensity can be obtained by the wavelength λ; however, in FIG. 6, the sufficient reflection light intensity may not be obtained due to the temperature fluctuation depending on the relation between the center wavelength of the reflection of the FBGs and the measurement wavelength. The threshold value is set in order to perform analysis only at the position where the sufficient reflection is obtained.

In addition, it is preferable that the signal processing unit 16 can determine the temporal change of the intensity of the reflection signals reflected at the same identified reflection positions, and can calculate the acoustic frequency at the reflection positions based on the temporal change. It is shown in FIG. 8 to FIG. 11 that identifying the reflection position which corresponds to the fiber Bragg grating where the reflection signal is reflected and then determining the temporal change of the intensity of the reflection signals reflected at the same identified reflection positions. For calculating the acoustic frequency at the reflection position based on the temporal change, Fourier transform analysis, for example, can be used.

It is possible for some of the function of the signal processing unit 16 to be substituted by other computers or operators. In this case, the results processed by the signal processing unit 16 is output to medium such as a memory device or paper, and other computers or operators perform subsequent analysis. As an example, one aspect can be shown that the signal processing unit 16 performs a step of determining the temporal change of the intensity of the reflection signals which have the same identified reflection positions and other computers or operators performs a step of calculating the acoustic frequency at the reflection position based on the temporal change of the reflection intensity and adding up acoustic frequencies relating to all FBGs.

In addition, as shown in FIG. 13, the above-described distributed acoustic sensor may include a control unit 30 which controls the light source unit 11 (function generator 11a) and the signal processing unit 16. In this case, by the control unit 30, the operation of the above-described light source unit 11 (function generator 11a) and the signal processing unit 16 can be controlled. In addition, the control unit 30 may be configured to function as the above-described computer.

The operation of the distributed acoustic sensor 50 shown in FIG. 13 is described. First, the light source unit 11 selects an emission wavelength from two or more emission wavelengths which can be output, and then the two or more optical pulses are output from the light source unit 11 to the optical fiber 12. Selecting the emission wavelength and controlling the optical pulses are performed by the function generator 11a. The light output from the light source unit 11 is input to the optical fiber 12 through the circulator 14. The reflection light from the optical fiber 12 is output to the optical receiver unit 15 through the circulator 14. At the optical receiver unit 15, the intensity of the reflection light is transformed to a reflection signal as a function of arrival time, and is sent to the signal processing unit 16. Parts of the light output from the light source unit 11 are split and sent to the second optical receiver unit 18 by the coupler 17, and sent to the signal processing unit 16 as a reference signal.

The signal processing unit 16 performs a measurement step that when the reflection signal intensity obtained by the optical receiver unit 15 is over a predetermined threshold value at every one emission wavelength, identifying a reflection position for each reflection signal and calculating an acoustic frequency at the identified fiber Bragg grating based on the temporal change of the intensity of the reflection signals reflected at the same identified reflection position.

If acoustic frequencies at positions of all FBGs can be determined by one cycle of the measurement step, then an acoustic distribution along a longitudinal direction of the optical fiber can be determined at that point. However, as described above, since a temperature at each FBG is different depending on the temperature distribution along the optical fiber and the long-term temperature fluctuation, a reflection center wavelength also shifts. Therefore, the measurement step is repeated more than two times while changing an emission wavelength of the light source unit 11, and as a result, the signal processing unit 16 can calculate acoustic frequencies at the reflection positions for all the two or more fiber Bragg gratings 13, 13, . . . , disposed at the optical fiber 12 and can determine the acoustic distribution based on the results.

Figure 14:
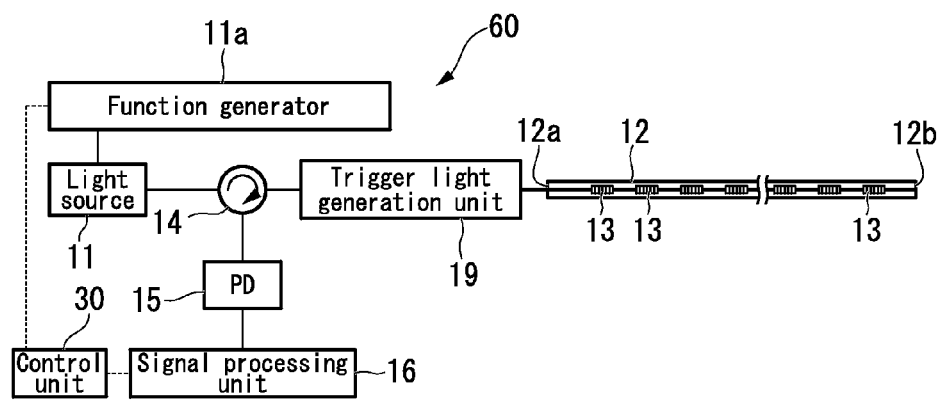
FIG. 14 is a schematic diagram showing a distributed acoustic sensor according to another exemplary embodiment of the present invention.

In FIG. 14, a distributed acoustic sensor 60 according to another exemplary embodiment of the present invention is shown. Comparing to the distributed acoustic sensor 10 shown in FIG. 1, the distributed acoustic sensor 60 is different in that a function generator 11a is connected to the light source unit 11, a signal processing unit 16 is connected to the optical receiver unit 15, a trigger light generation unit 19 is provided between a circulator 14 and the optical fiber 12, and so on. Comparing FIG. 13 with FIG. 14, instead of providing the coupler 17 and the second optical receiver unit 18 in FIG. 13, the trigger light generation unit 19 is disposed in FIG. 14.

In the distributed acoustic sensor 60, an input light is partially reflected by the trigger light generation unit 19, and the optical receiver unit 15 receives the reflection light and generates a reference signal. This configuration is different from shown in FIG. 13 in that the reference signal and the reflection signal are generated by the same optical receiver unit 15; however, a method of processing the reference signal and the reflection signal by the signal processing unit 16 is the same.

In addition, as shown in FIG. 14, the above-described distributed acoustic sensor may include a control unit 30 which controls the light source unit 11 (function generator 11a) and the signal processing unit 16. In this case, by the control unit 30, the operation of the above-described light source unit 11 (function generator 11a) and the signal processing unit 16 can be controlled. In addition, the control unit 30 may be configured to function as the above-described computer.

It is preferable that the trigger light generation unit 19 is a partial reflection unit capable of partially reflecting the reference lights at all wavelengths even when the wavelength of the light output from the light source unit 11 is shifted. A specific example is a partial reflection film which has a reflection bandwidth broader than that of an FBG. The trigger light generation unit 19 may be provided inside the optical fiber 12 or may be formed at the first end 12a of the optical fiber 12, and an optical device may be inserted between the first end 12a and the circulator 14.

Hereinabove, the present invention has been described based on a preferred exemplary embodiment, however, the present invention is not limited the aforementioned exemplary embodiment, and various modifications can be made within a scope that does not depart from the gist of the present invention.

As a light branching unit which separates a light directed from the light source to an optical fiber into a measurement light and a reference light, the light splitting unit and the partial reflection unit are shown; however, other arbitrary configurations can be utilized.

When repeating the measurement step more than two times while changing the emission wavelength of the light source unit, as the light source unit, a configuration which is capable of emitting optical pulses at the light source unit and uses all two or more emission wavelengths can also be utilized. In this case, since the necessary steps can be automatically performed without taking into consideration of fiber Bragg gratings where the acoustic frequency are measured by the signal processing unit, the configuration of the equipment can be more simplified.

When repeating the measurement step more than two times while changing the emission wavelength of the light source unit, the signal processing unit determines whether or not the acoustic frequency at the reflection position is calculated for all two or more FBGs disposed in the optical fiber, and if the determination result is "yes", a configuration of not repeating the above-mentioned measurement step can be utilized.

In this case, when all data which is necessary for calculating an acoustic distribution is obtained, it is possible to terminate the measurement immediately. Therefore, the measurement time can be reduced.

It is efficient if the predetermined signals are transmitted by wired or wireless connections to the light source unit (for example, a function generator) and the operation of the light source unit is terminated.

Note that in the present configuration, it is also possible to omit the signal transmission from the signal processing unit to the light source unit. In this case, after the signal processing unit determines the termination of the measurement, the operation of the light source unit continues. However, since at the signal processing unit, it is determined that the measurement is terminated, the reflection signals sent from the optical receiver unit continuously can neglected and the results of the acoustic distribution can be obtained based on the data obtained at the time when determining the termination of the measurement.

EXAMPLES

Hereinbelow, an Example of the present invention is described.

Figure 15:
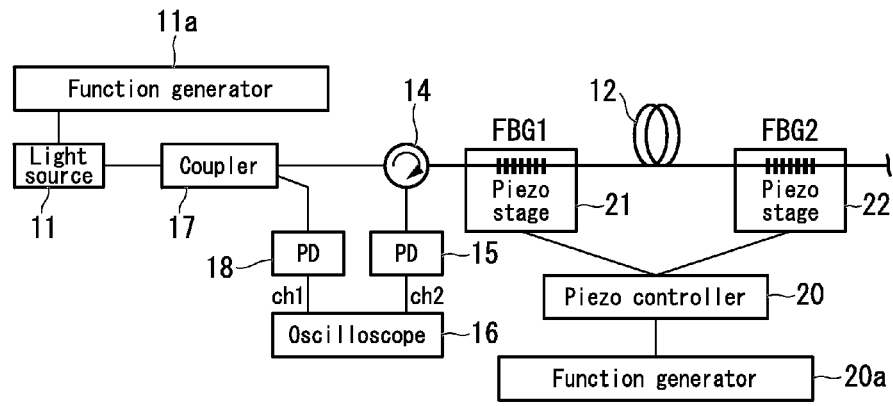
FIG. 15 is a schematic diagram showing an example of experimental equipment used in the exemplary embodiment.

In FIG. 15, experimental equipment used in the present example is shown. In this experimental equipment, in addition to the distributed acoustic sensor similar to shown in FIG. 13, piezo stages 21, 22 which artificially inducing vibration near the FBGs are provided. In addition, in order to control respective piezo stages 21, 22, a piezo controller 20 including a function generator 20a is connected. At each of the two FBGs, one piezo stage is provided. As a consequence, in the present experimental equipment, the FBG1 and the FGB2 can be vibrated independently. Note that as the optical fiber 12, an optical fiber is used that has a cladding of made pure silica glass, a core made of germanium-doped silica glass, relative refractive index difference ($\Delta$) between the core and the cladding of approximately 0.3%, a cladding diameter of 125 μm, and a diameter of 155 μm with polyimide-coated. Moreover, the temperature dependence of the FBGs fabricated in this optical fiber 12 is measured and confirmed in advance that it is approximately 10.4 pm/° C.

A light source of the light source unit 11 can generate optical pulses intermittently at a repetition frequency of 20 kHz and a pulse duration 70 ns. The reflectivity of two fiber Bragg gratings (the FBG1 and the FBG2) is 0.005%. A distance between the FBG1 and the FBG2 as a length along the optical fiber 12 is approximately 4.6 km. As the signal processing unit 16, an oscilloscope is used. As the coupler 17, a 17 dB coupler is used. As the optical receiver unit 15 and the second optical receiver unit 18, optical detectors are used.

Figure 16:
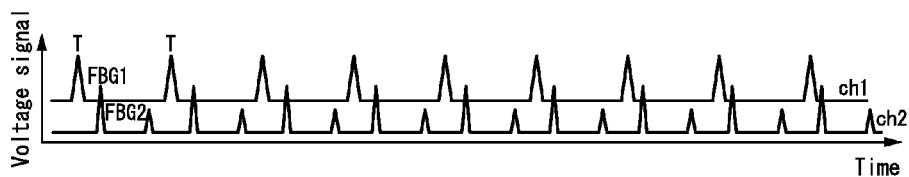
FIG. 16 is a schematic diagram showing an example of voltage signals which are received at an oscilloscope in the exemplary embodiment.

In FIG. 16, a schematic diagram of the electric signals which are transmitted to the signal processing unit 16 in the device described in FIG. 15 is shown. Between the reference signals T of a channel 1 (ch 1) generated by the second optical receiver unit 18, a reflection signal of the FBG1 and a reflection signal of the FBG2 of a channel 2 (ch 2) generated by the optical receiver unit 15 are observed.

Figure 17:
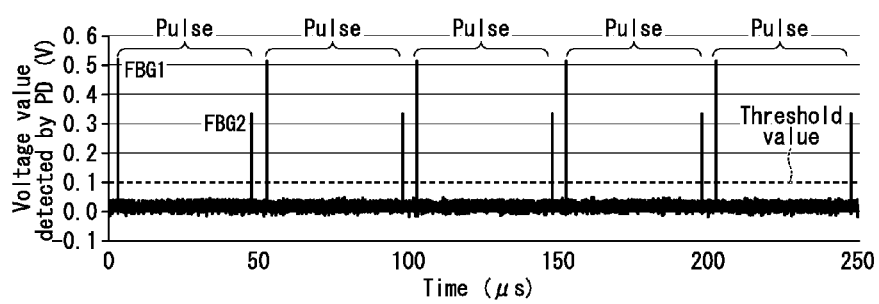
FIG. 17 is a graph showing a measurement result of a non-vibration state by the enlarged five-pulse duration.

In FIG. 17, a measurement result of the FBG1 and the FBG2 in a non-vibration state is shown by the enlarged five-pulse duration. The sampling rate is 500 MHz. In other words, in the optical receiver unit 15, the intensities of the reflection light are sampled at every 2 ns (nanosecond). The threshold value is set to be approximately 0.1 V as a sufficiently higher level than a noise level.

Figure 18:
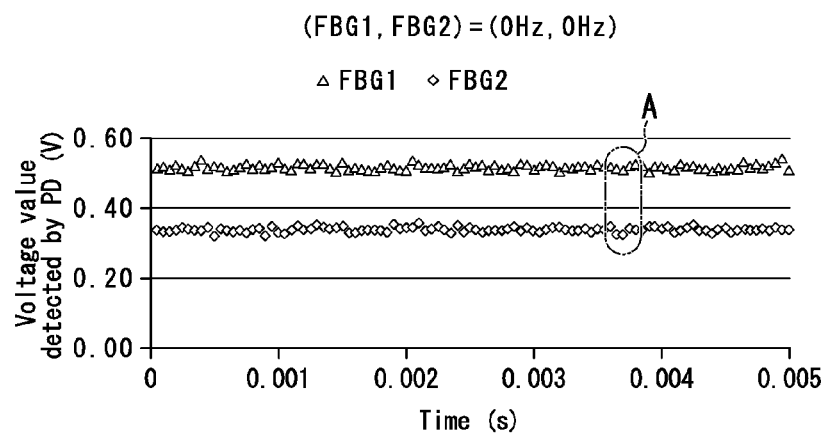
FIG. 18 is a graph showing a measurement result of a non-vibration state.

In FIG. 18, the results of measuring the FBG1 and the FBG2 in a non-vibration state are shown in the range of 0.005 s (5 ms). FIG. 17 corresponds to portion A of FIG. 18. There is almost no temporal change of the reflection signals, and it is confirmed that there is no vibration. The reflection signal intensity of both the FBG1 and the FBG2 are higher than the threshold value; therefore, each FBG is in a non-vibration state, but not in a state that the reflection light cannot be detected.

Figure 19:
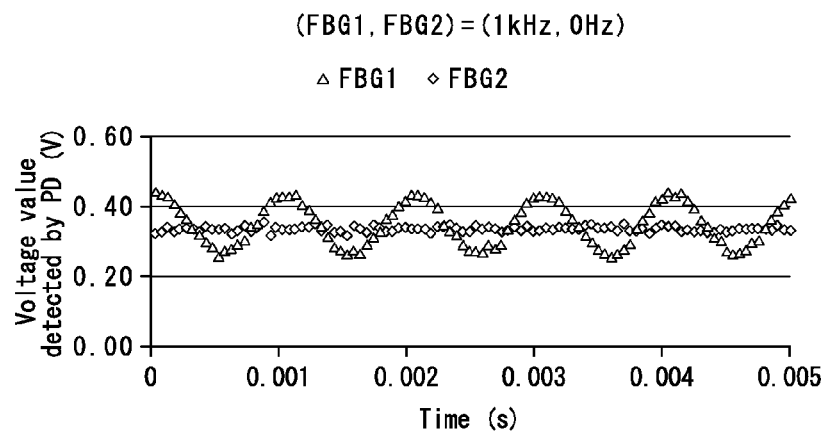
FIG. 19 is a graph showing a measurement result when the FBG1 is vibrated at 1 kHz.

In FIG. 19, a graph is illustrated that shows with the FBG2 being in a non-vibration state, a measurement result when FBG1 is vibrated at 1 kHz by a piezo stage 21. Almost no temporal change of the reflection signal of the FBG2 can be observed; however, the reflection signal of the FBG1 is vibrated at the period of approximately 0.001 s (1 ms). As a result, it can be confirmed that the FBG1 is vibrated at 1 kHz. The reflection signal intensity of the FBG2 is higher than the threshold value; therefore, the FBG2 is in a non-vibration state.

Figure 20:
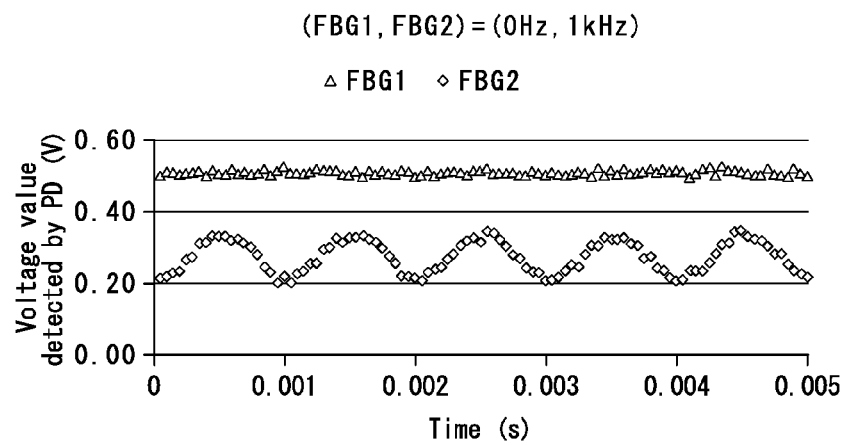
FIG. 20 is a graph showing a measurement result when the FBG2 is vibrated at 1 kHz.

In FIG. 20, a graph is illustrated that shows with the FBG1 being in a non-vibration state, a measurement result when FBG2 is vibrated at 1 kHz by a piezo stage 22. Almost no temporal change of the reflection signal of the FBG1 can be observed; on the other hand, the reflection signal of the FBG2 is vibrated at the period of approximately 0.001 s (1 ms). As a result, it can be confirmed that the FBG2 is vibrated at 1 kHz. The reflection signal intensity of the FBG1 is higher than the threshold value; therefore, the FBG1 is in a non-vibration state.

Figure 21:
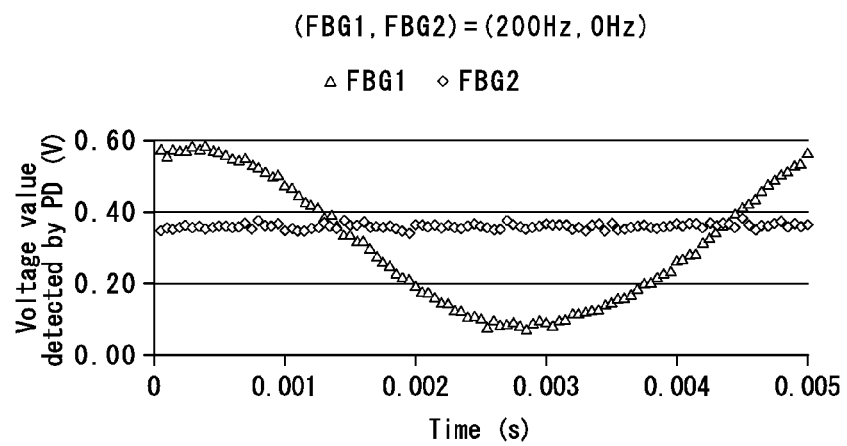
FIG. 21 is a graph showing a measurement result when the FBG1 is vibrated at 200 Hz.

In FIG. 21, a graph is illustrated that shows with the FBG2 being in a non-vibration state, a measurement result when the FBG1 is vibrated at 200 Hz by a piezo stage 21. Almost no temporal change of the reflection signal of the FBG2 can be observed; however, the reflection signal of the FBG1 is vibrated at approximately 0.005 s (5 ms) period. As a result, it can be confirmed that the FBG1 is vibrated at 200 Hz. Since the intensity of a reflection signal of the FBG2 is higher than the threshold value, it is confirmed that the FBG2 is in a non-vibration state.

Figure 22:
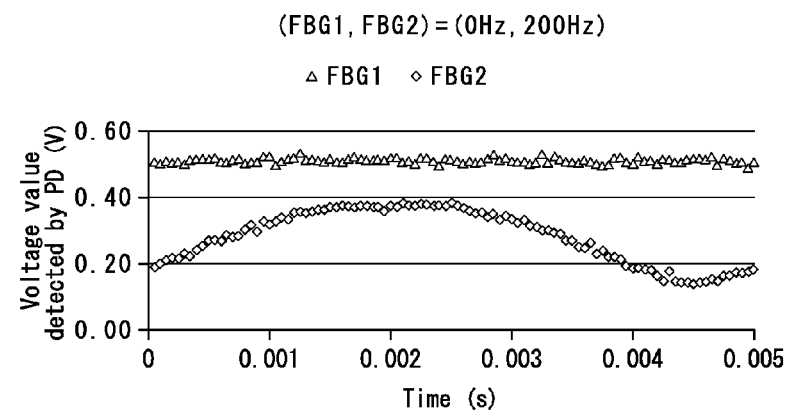
FIG. 22 is a graph showing a measurement result when the FBG2 is vibrated at 200 Hz.

In FIG. 22, a graph is illustrated that shows with the FBG1 being in a non-vibration state, a measurement result when the FBG2 is vibrated at 200 Hz by a piezo stage 22. Almost no temporal change of the reflection signal of the FBG1 can be observed; however, the reflection signal of the FBG2 is vibrated at approximately 0.005 s (5 ms) period. As a result, it can be confirmed that the FBG2 is vibrated at 200 Hz. Since the intensity of a reflection signal of the FBG1 is higher than the threshold value, it is confirmed that the FBG1 is in a non-vibration state.

Figure 23:
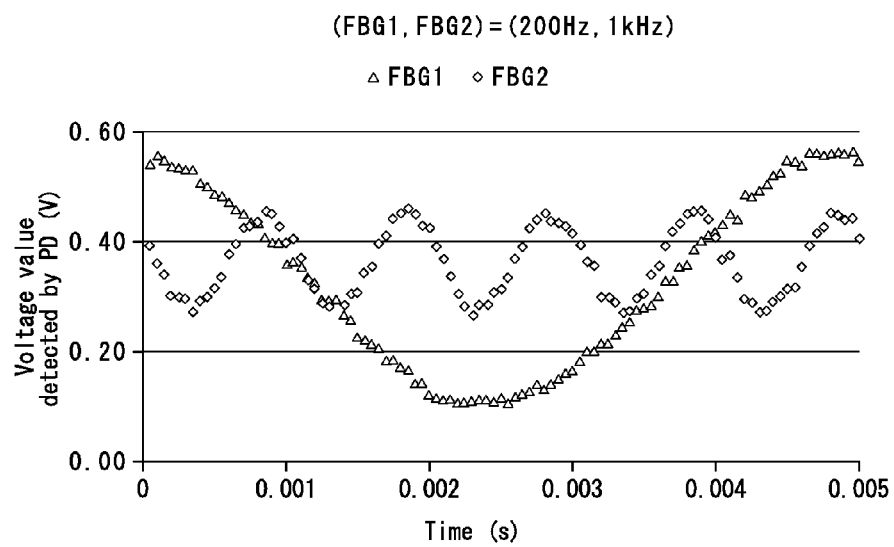
FIG. 23 is a graph showing a measurement result when the FBG1 is vibrated at 200 Hz and the FBG2 is vibrated at 1 kHz.

In FIG. 23, a graph is illustrated that shows a measurement result when the FBG1 is vibrated at 200 Hz and the FBG2 is vibrated at 1 kHz. The reflection signal of the FBG1 is vibrated at approximately 0.005 s (5 ms) period, and as a result, it can be confirmed that the FBG1 is vibrated at 200 Hz. The reflection signal of the FBG2 is vibrated at approximately 0.001 s (1 ms) period, and as a result, it can be confirmed that the FBG2 is vibrated at 1 kHz.

Figure 24:
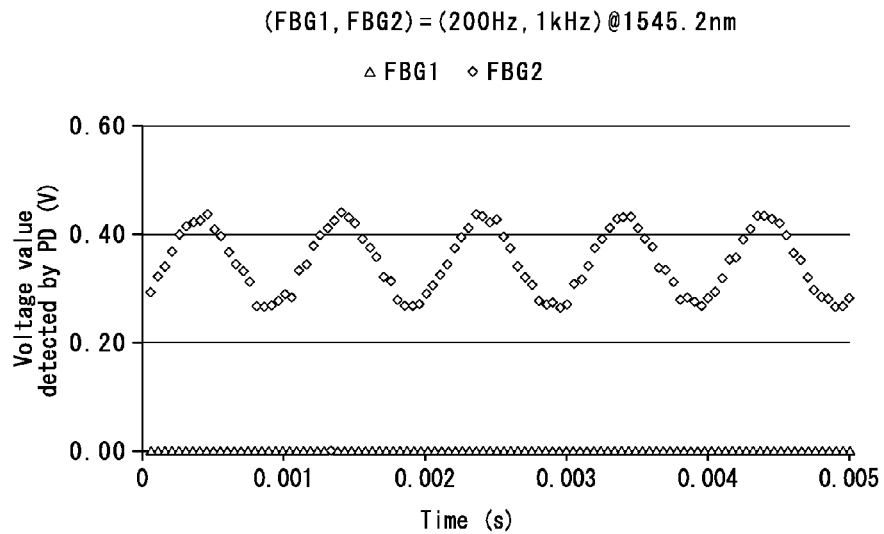
FIG. 24 is a graph showing a measurement result when the FBG1 is heated at a high temperature and only at the FBG2, vibration is detected from a reflection light.
Figure 25:
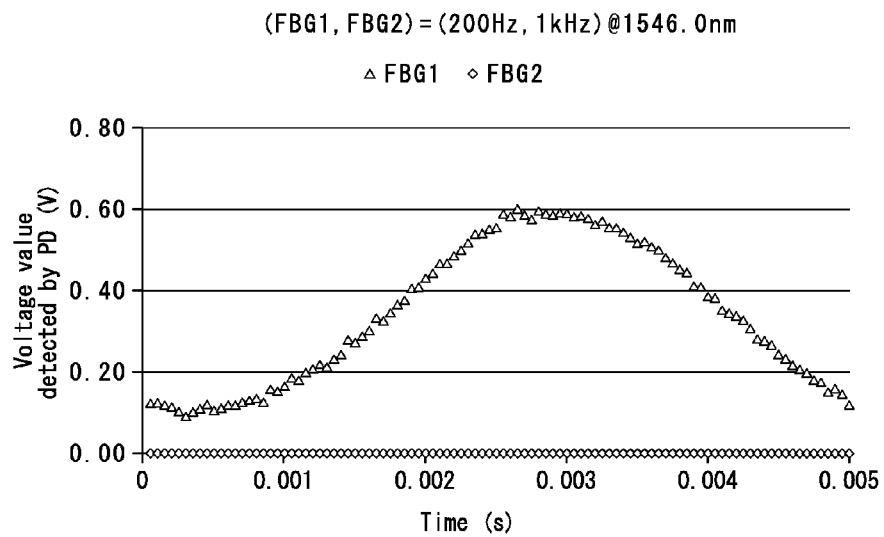
FIG. 25 is a graph showing a measurement result when the FBG1 is heated at a high temperature and only at the FBG1, vibration is detected from a reflection light.

In FIGS. 24 and 25, graphs are illustrated that respectively show a measurement result when the FBG1 is vibrated at 200 Hz and is in a thermostat bath with a temperature of approximately 100° C. and a measurement result when the FBG2 is vibrated at 1 kHz and is in an atmosphere with a temperature of approximately 25° C.

When the emission wavelength of the light source is 1545.2 nm, as shown in FIG. 24, the vibration is detected from the reflection light only at the FBG2. This is because that the reflection light cannot be detected at 1545.2 nm since the Bragg wavelength shifted due to the temperature fluctuation at the FBG1, and the reflection signal of the FBG2 is vibrated at approximately 0.001 s (1 ms) period. From the above, it can be confirmed that the FBG2 is vibrated at 1 kHz. The reflection signal intensity of the FBG1 is lower than the threshold value; therefore, the FBG1 is in a state that the reflection light cannot be detected, but not in a non-vibration state.

Next, so as to be able to detect the reflection light of the FBG1, the wavelength of the measurement light is shifted to 1546.0 nm. In this case, as shown in FIG. 25, only at the FBG1, vibration is detected from the reflection light. The reflection signal of the FBG1 is vibrated at approximately 0.005 s (5 ms) period. As a result, it is confirmed that the FBG1 is vibrated at 200 Hz. Since the reflection signal intensity of the FBG2 is lower than the threshold value, it is confirmed that the FBG2 is not in a non-vibration state, but is under the condition that the reflection lights of the FBG2 cannot be detected.

With a combination of the results shown in FIGS. 24 and 25, even in the circumstance that the Bragg reflection of the FBG cannot be detected at the same wavelengths of the measurement lights due to the temperature difference between the FBG1 and the FBG2, it can be determined that an acoustic frequency at FBG1 position is approximately 200 Hz and an acoustic frequency at FBG2 position is approximately 1 kHz.

In the present example, even when there is a temperature difference of 75° C., the reflection lights of each FBG can be observed by shifting the measurement wavelength by approximately 0.8 nm. Since the wavelength shift of the FBG is approximately proportional to the temperature fluctuation, the reflection lights of all FBGs can be observed similarly even when the temperature distribution from 25-300° C. exists along a longitudinal direction of the optical fiber if the measurement wavelength is shifted by approximately 3 nm.

Depending on an interval of the measurement wavelengths, it may be possible that the FBGs detectable at several wavelengths. In this case, the step such as averaging the results of measuring vibration at several wavelengths or focusing on the results measured at a wavelength having a high intensity of the reflection light may be performed.

The present invention can be used for a method of measuring an acoustic distribution and a distributed acoustic sensor.

What is claimed is:

1. A method of measuring an acoustic distribution, the method comprising:
   using a distributed acoustic sensor which comprises:
      a light source unit which is capable of emitting optical pulses at two or more emission wavelengths;
      an optical fiber which comprises two or more fiber Bragg gratings disposed between a first end of the optical fiber and a second end of the optical fiber along a longitudinal direction of the optical fiber, the first end being close to the light source unit and the second end being far from the light source unit;
      an optical receiver unit, which receives a reflection light emitted from the light source unit and reflected at one or more of the two or more fiber Bragg gratings and which converts the reflection light to a reflection signal by an optical to electrical conversion;
      a light branching unit which separates a light output from the light source unit into a measurement light which is directed to the two or more fiber Bragg gratings and a reference light which is to be converted to a reference signal by an optical to electrical conversion without reaching any of the two or more fiber Bragg gratings; and
      a signal processing unit analyzing the reflection signal and the reference signal; and
   calculating acoustic frequencies for all of the two or more fiber Bragg gratings disposed at the optical fiber to determine an acoustic distribution along the longitudinal direction of the optical fiber, by repeating a measurement step more than two times while changing an emission wavelength of the light source unit, the measurement step comprising:
outputting the two or more optical pulses from the light source unit to the optical fiber at intervals, two or more optical pulses having one emission wavelength selected from among the two or more emission wavelengths;
identifying a fiber Bragg grating, which reflects the reflection light corresponding to the reflection signal, among the two or more fiber Bragg gratings by the signal processing unit based on a time difference between when the reflection signal is detected and when the reference signal is detected in a case where a reflection signal intensity obtained by the optical receiver unit is over a predetermined threshold value, and obtaining a temporal change of a reflection signal intensity at the identified fiber Bragg grating; and
calculating an acoustic frequency at the identified fiber Bragg grating based on the temporal change of the reflection signal intensity, wherein:
at the light source unit, a difference of two different emission wavelengths arbitrarily selected from among the two or more fiber Bragg gratings is greater than a maximum value $\Delta\lambda a$ of a wavelength width of an optical pulse output at each of the two or more emission wavelengths; and
at the optical fiber, a minimum value $\Delta\lambda b$ of a reflection bandwidth of the two or more fiber Bragg gratings is greater than the maximum value $\Delta\lambda a$ of the wavelength width.

2. The method of measuring an acoustic distribution according to claim 1, wherein the measurement step is repeated so as to use all of the two or more emission wavelengths.

3. The method of measuring an acoustic distribution according to claim 1, comprising determining whether or not the signal processing unit calculates the acoustic frequencies at all of the two or more fiber Bragg gratings disposed at the optical fiber,
wherein when acoustic frequencies at all of the two or more fiber Bragg gratings are calculated by the signal processing unit, the measurement step is not repeated.

4. The method of measuring an acoustic distribution according to claim 1, wherein:
the distributed acoustic sensor comprises a second optical receiver unit which receives the reference light and converts the reference light to the reference signal by an optical to electrical conversion; and
the light branching unit is a light splitting unit which is disposed between the light source unit and the first end and capable of branching a light output from the light source unit into the reference light which is directed to the second optical receiver unit and the measurement light which is directed to the first end.

5. The method of measuring an acoustic distribution according to claim 1, wherein:
the light branching unit is a partial reflection unit which is disposed at the optical fiber and capable of partially reflecting a light as the reference light at all of the two or more emission wavelengths; and
the optical receiver unit receives the reference light and the reflection light.

6. A distributed acoustic sensor comprising:
a light source unit which is capable of emitting optical pulses at two or more emission wavelengths and outputting two or more optical pulses at each of the emission wavelengths, the two or more optical pulses being output at intervals;
an optical fiber which comprises two or more fiber Bragg gratings disposed between a first end of the optical fiber and a second end of the optical fiber along a longitudinal direction of the optical fiber, the first end being close to the light source unit and the second end being far from the light source unit;
an optical receiver unit, which receives a reflection light emitted from the light source unit and reflected at one or more of the two or more fiber Bragg gratings and which converts the reflection light to a reflection signal by an optical to electrical conversion;
a light branching unit which separates a light output from the light source unit into a measurement light which is directed to the two or more fiber Bragg gratings and a reference light which is to be converted to a reference signal by an optical to electrical conversion without reaching any of the two or more fiber Bragg gratings;
a signal processing unit being configured to identify a fiber Bragg grating, which reflects the a reflection light corresponding to the reflection signal, among the two or more fiber Bragg gratings based on a time difference between when the reflection signal is detected and when the reference signal is detected in a case where a reflection signal intensity obtained by the optical receiver unit is over a predetermined threshold value, and to obtain a temporal change of a reflection signal intensity at the identified fiber Bragg grating; and
a control unit being configured to calculate acoustic frequencies for all of the two or more fiber Bragg gratings disposed at the optical fiber to determine an acoustic distribution along the longitudinal direction of the optical fiber, by repeating a measurement step more than two times while changing an emission wavelength of the light source unit, the measurement step comprising:
outputting two or more optical pulses from the light source unit to the optical fiber at intervals, the two or more optical pulses having one emission wavelength selected from among the two or more emission wavelengths;
identifying a fiber Bragg grating, which reflects the reflection light corresponding to the reflection signal, among the two or more fiber Bragg gratings by the signal processing unit in a case where a reflection signal intensity obtained by the optical receiver unit is over a predetermined threshold value, and obtaining a temporal change of a reflection signal intensity at the identified fiber Bragg grating; and
calculating an acoustic frequency at the identified fiber Bragg grating based on the temporal change of the reflection signal intensity, wherein:
at the light source unit, a difference of two different emission wavelengths arbitrarily selected from among the two or more fiber Bragg gratings is greater than a maximum value $\Delta\lambda a$ of a wavelength width of an optical pulse emitted at each of the two or more emission wavelengths; and
at the optical fiber, a minimum value $\Delta\lambda b$ of a reflection bandwidth of the two or more fiber Bragg gratings is greater than the maximum value $\Delta\lambda a$ of the wavelength width.

7. The distributed acoustic sensor according to claim 6, wherein the control unit is configured to repeat the measurement step so as to use all of the two or more emission wavelengths.

8. The distributed acoustic sensor according to claim 6, wherein the control unit is configured to determine whether or not the signal processing unit calculates the acoustic frequencies at all of the two or more fiber Bragg gratings disposed at the optical fiber, and when the control unit determines that the acoustic frequencies at all of the two or more fiber Bragg gratings are calculated by the signal processing unit, the measurement step is not repeated.

9. The distributed acoustic sensor according to claim 6, further comprising a second optical receiver unit which receives the reference light and converts the reference light to the reference signal by an optical to electrical conversion, wherein
   the light branching unit is a light splitting unit that is disposed between the light source unit and the first end and capable of branching a light output from the light source unit into the reference light which is directed to the second optical receiver unit and the measurement light which is directed to the first end.

10. The distributed acoustic sensor according to claim 6, wherein:
   the light branching unit is a partial reflection unit which is disposed at the optical fiber and capable of partially reflecting the light as the reference light at all of the two or more emission wavelengths; and
   the optical receiver unit receives the reference light and the reflection light.

* * * * *